United States Patent [19]
Ackley

[11] Patent Number: 5,811,777
[45] Date of Patent: Sep. 22, 1998

[54] METHOD AND APPARATUS FOR UTILIZING SPECULAR LIGHT TO IMAGE LOW CONTRAST SYMBOLS

[75] Inventor: H. Sprague Ackley, Seattle, Wash.

[73] Assignee: Intermec Corporation, Everett, Wash.

[21] Appl. No.: 680,239

[22] Filed: Jul. 11, 1996

[51] Int. Cl.⁶ ................................................ G06K 7/10
[52] U.S. Cl. ............................... 235/462; 235/454
[58] Field of Search ............................ 235/462, 472, 235/454, 455; 250/559.44, 555

[56] References Cited

U.S. PATENT DOCUMENTS

| | | |
|---|---|---|
| 3,169,186 | 2/1965 | Howard . |
| 4,408,120 | 10/1983 | Hara et al. . |
| 4,831,275 | 5/1989 | Drucker .............................. 235/462 X |
| 4,845,349 | 7/1989 | Cherry ..................................... 235/462 |
| 5,140,146 | 8/1992 | Metlitsky et al. . |
| 5,247,162 | 9/1993 | Swartz et al. . |
| 5,393,967 | 2/1995 | Rice et al. . |
| 5,401,944 | 3/1995 | Bravman et al. .................... 235/462 X |
| 5,449,892 | 9/1995 | Yamada .................................. 235/462 |
| 5,468,946 | 11/1995 | Oliver ..................................... 235/462 |

*Primary Examiner*—Donald T. Hajec
*Assistant Examiner*—Karl Frech
*Attorney, Agent, or Firm*—Graham & James LLP

[57] ABSTRACT

An apparatus and method for imaging low contrast one and two-dimensional symbols are provided. A light source directs light onto a target that includes a low contrast symbol. An imaging element receives light reflected off of the target and creates an image of the target therefrom. A light level detector determines the intensity level of the light received by the imaging element, and when the intensity level exceeds a predetermined threshold, a controller causes the image data created by the imaging element to be stored in a data memory.

22 Claims, 4 Drawing Sheets

METHOD AND APPARATUS FOR UTILIZING SPECULAR LIGHT TO IMAGE LOW CONTRAST SYMBOLS

BACKGROUND OF THE INVENTION

1. Field of the Invention

The present invention relates to electro-optical scanners for reading a one or two-dimensional bar code symbology, and more particularly, to a portable or fixed position scanner capable of specular imaging in very low contrast symbology environments.

2. Description of Related Art

Optical imaging systems are commonly used to decipher data symbols printed on objects in order to identify the objects or to capture information relating to the object. A bar code symbol represents a common one-dimensional form of symbology, and comprises a pattern of vertical bars of various widths separated by spaces of various widths. Because the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various applications, such as inventory control, point of sale identification, or logistical tracking systems.

Since the conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square marks disposed at particular rows and columns of the matrix correspond to the information being conveyed. As a result, a two-dimensional matrix symbology can compress significantly more data into a given volume of space than a conventional one-dimensional bar code.

In one particular application of a two-dimensional symbology, a small symbol can be placed directly onto items having low surface area, such as electronic components. The two-dimensional symbol could be formed directly onto the ceramic or plastic package of the electronic components by laser etching or other precision machining process. Since a two-dimensional symbology can compress fifty or more characters of data within a relatively small dimensional space, the symbol can store a unique identifier code for the component, including such information as serial number, lot number, batch number, model number, and/or customer code. The symbols can be used to automate the manufacturing or testing processes, and may also enable manufacturers to protect against component theft or forgery.

As known in the art, the two-dimensional symbols are read by scanners that convert the symbols into pixel information, such as described in U.S. Pat. No. 4,988,852 issued to Krishnan. The pixel information is in turn deciphered into the alphanumeric information represented by the symbol. Such scanners often utilize charge-coupled device (CCD) technology to convert optical information from the symbol into an electrical signal representation of the matrix. A light source illuminates the symbol, and diffuse light reflected off the symbol is focused onto the surface of the CCD device. The two-dimensional scanners may be provided in a portable device so that they can be brought into close proximity with the item on which the symbol is placed, such as disclosed in U.S. Pat. No. 5,378,883 issued to Batterman et al. The scanner may also be provided in a fixed-position device that images items as they pass by, such as on a production line.

A significant drawback of such etched or machined symbols is that they have very low contrast and, as a result, are difficult to image. Since the symbol characters are formed by shallow cuts into the surface of a component, there is little color difference between the characters and the remaining uncut surface area of the component. To compound this problem, electronic components often have a dull black finish that tends to further obscure the symbol characters. The characters can only be distinguished by the slight difference in shade due to shadows which form in the etched regions. U.S. Pat. No. 5,393,967 issued to Rice et al. discloses a system for reading symbols encoded as a low contrast relief pattern. The disclosed system sweeps or scans a line of light across the relief pattern at a first angle and views light reflected off of the relief pattern at a second angle. The system disclosed in the Rice patent necessarily utilizes relatively complex mechanical and optical systems, which presents a drawback to the system.

Accordingly, a need exists for a method and apparatus for making images of low contrast symbols.

SUMMARY OF THE INVENTION

In accordance with the teachings of the present invention, an apparatus and method that permits specular imaging of low contrast symbols is provided.

Particularly, the imaging device of the present invention includes a light source for directing light onto a target that includes a low contrast symbol. An imaging element receives specular light reflected off of the target and creates an image of the target therefrom that is stored in a data memory. In an embodiment of the invention, a light level detector determines the intensity level of the light received by the imaging element, and when the intensity level exceeds a predetermined threshold, a controller causes the image data created by the imaging element to be stored in the data memory.

A more complete understanding of the present invention will be afforded to those skilled in the art, as well as a realization of additional advantages and objects thereof, by the following detailed description of the preferred embodiment. Reference will be made to the appended sheets of drawings which will first be described briefly.

DETAILED DESCRIPTION OF THE PREFERRED EMBODIMENT

The present invention satisfies the need for a method and apparatus for making images of low contrast symbols. It does so by utilizing specular light that has reflected off of a symbol to create an image of the symbol. In the detailed description that follows, like element numerals are used to describe like elements that are illustrated in one or more of the figures.

Figure 1:
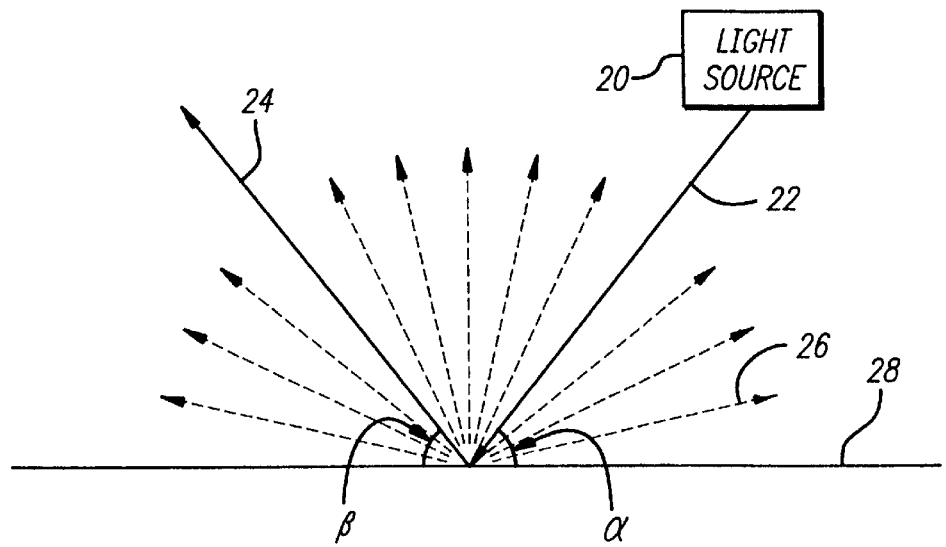
FIG. 1 illustrates specular and diffuse light reflected off of a surface.

As illustrated in FIG. 1, two types of light are produced when light 22 reflects off of a surface 28: specular light 24 and diffuse light 26. Specular light 24 is that portion of the original light 22 that reflects directly off of the surface 28. Diffuse light 26, on the other hand, is that portion of the original light 22 which is scattered when the original light 22 hits the surface 28. As also illustrated in FIG. 1, specular light 24 is concentrated along a path having an angle of reflection β that is approximately equal to the angle of incidence α of the original light 22, while diffuse light 26 is scattered in all directions away from the point of reflection of the original light 22. Because most of the original light 22 is reflected directly off of the surface 28, specular light 24 is far more intense than diffuse light.

Prior art imaging systems use only diffuse light to create an image of a target 28. This is because an imaging system need not be precisely positioned to received diffuse light, and diffuse light is sufficiently intense to illuminate the color distinctions in a typical printed bar code. Because specular light is far more intense than diffuse light and would "blind" a system designed to receive diffuse light, prior art systems typically include a filter to remove any specular light from the light that is reflected onto the imaging system. Such systems also typically include a gain control circuit to boost the level of electrical signals produced from the diffuse light to obtain an image.

In contrast to prior art imaging systems, the present invention utilizes specular light 24 to create an image of a low contrast symbol, such as an etched bar code symbol. Specular light 24 is utilized because it is significantly more intense than diffuse light, and is therefore able to illuminate the subtle color or shading distinctions between characters in an etched bar code. As described above, the characters in an etched bar code can be distinguished only by the slight difference in shade due to shadows which form in the more deeply etched regions of the symbol. Diffuse light usually cannot be utilized because it is not sufficiently intense to illuminate such subtle color distinctions.

Figure 2:
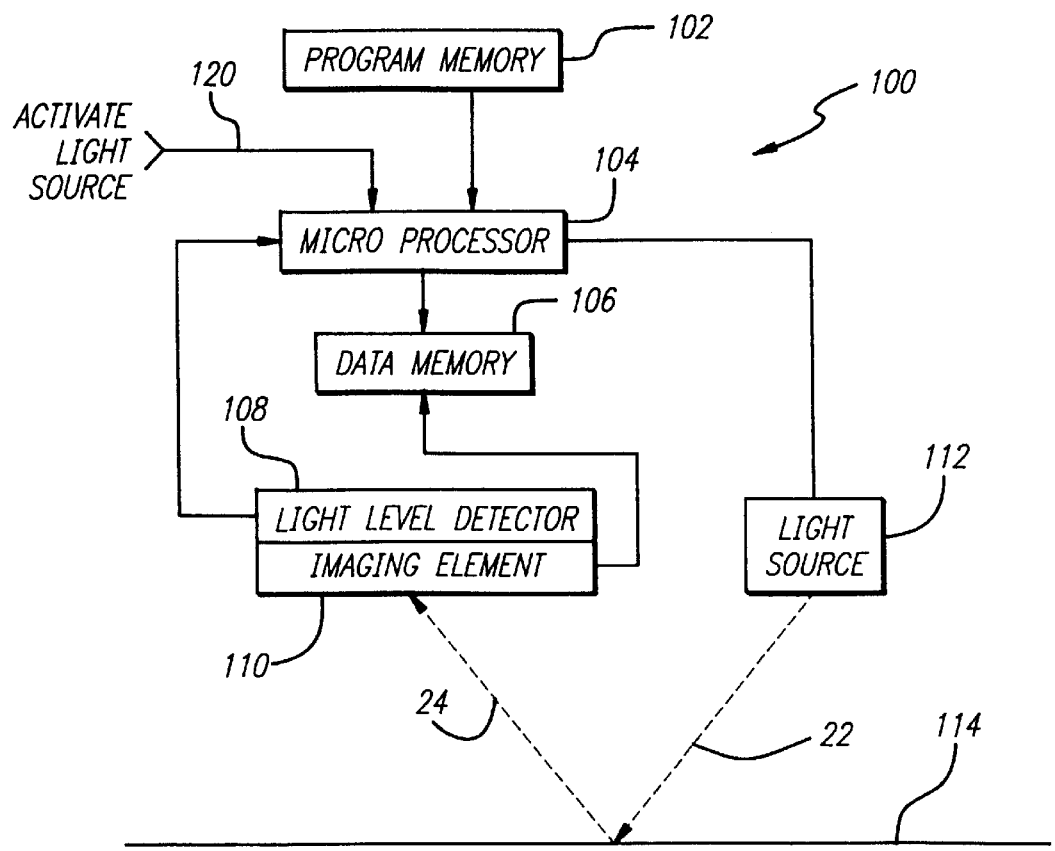
FIG. 2 illustrates an exemplary embodiment of an imaging system of the present invention.

Referring next to FIG. 2, an exemplary embodiment of an imaging system 100 that includes the teachings of the present invention is illustrated. The system 100 includes a program memory 102, a microprocessor 104, a data memory 106, an imaging element 110, a light level detector 108, and a light source 112. The system 100 may also include a gain control (not shown) for controlling the output level of signals produced by the imaging element 110.

The entire imaging system 100 may be contained within a single unit. Alternatively, the elements may be distributed so that a simple, lightweight unit is used to create image data and transmit the data to a central unit for further processing. The image data may then be transmitted to an attached computer, stored locally for later transfer or forwarded to an application program resident within the imaging system itself.

The microprocessor 104 controls one or more operations of the imaging system 100 in accordance with instruction sets, e.g., software or firmware, stored in the program memory 102. As will be explained in more detail below, the microprocessor 104 controls activation of the light source 112 and the storing of data in the data memory 106. The microprocessor 104 may also perform other operations, such as decoding image data stored in the data memory 106, transferring the image data to other systems, etc.

Any conventional microprocessor may be used with the present invention, such as the TI-C30 processor available from Texas Instruments, Inc. The program memory 102 is preferably a semiconductor-based read only memory (ROM) device because such devices are non-volatile and permit the stored instructions to remain in storage within the devices even after electrical power is removed.

It should be apparent that the functions performed by the stored instruction set may also be accomplished by traditional hard wired circuits, but software or firmware systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as program memory 102, such as magnetic or optical disks.

A light source 112, which is activated under control of the microprocessor 104, generates light 22. When the system 100 is positioned in proximity to a target 114, the generated light 22 illuminates the target 114. The light source can comprise any well known mechanism for generating light such as an incandescent light source, a light emitting or laser diode, etc. Light reflects off of the target 114 and onto an imaging element 110.

The imaging element 110 converts the received light 24 into a plurality of electrical signals that correspond to the intensity of the received light. The plurality of electrical signals are then amplified and converted into digitized data, which represent an image of the target 114. The imaging element 110 may comprise a charge coupled device (CCD).

Typically, a CCD comprises a one-dimensional or two-dimensional array of adjacent photodiodes with each photodiode defining a distinct picture element. (or pixel) of the array. It should be noted that the array of the CCD imaging element is not limited to any particular pattern. For example, the array can be arranged in the usual order of linear rows and columns; the array can be arranged in a diamond pattern in which the rows are linear and the columns are offset in a regular fashion; or the array can be arranged in any other pattern in which the photodiodes are ordered relative to each other.

Each photodiode of the CCD array generates a voltage and/or current that represents the intensity of the light reflected onto the particular photodiode. The CCD array is scanned electronically by activating the individual photodiodes in a sequential manner in order to produce an output signal containing the voltage and/or current levels from each photodiode. The detected voltage and/or current levels are then amplified and converted to binary data values.

After the imaging element 110 converts the received light 24 into binary data values representing an image of the target 114, the binary data values are transmitted to a data memory 106, which may comprise a conventional semiconductor-based random access memory (RAM). Upon receiving a "write" signal from the microprocessor 104, the transmitted binary data values are stored in the data memory 106.

The imaging element 110 includes a light level detector 108 for detecting the intensity level of the light 24 reflected onto the imaging element. The light level detector 108 preferably provides a digitized output to the microprocessor 104 indicating the instantaneous intensity level of the light 24 reflected onto the imaging element 110. Such light level detectors are well known in the art, and any suitable detector can be used with the present invention.

Figure 3A:
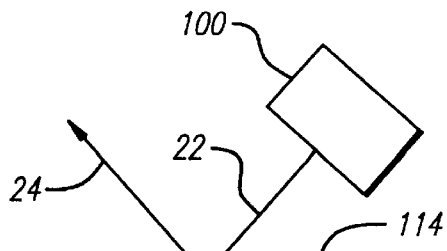
FIGS. 3a–3c illustrate positioning of the imaging system of FIG. 2 so as to receive reflected specular light.
Figure 3B:
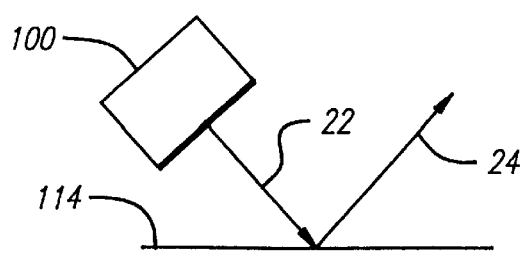
Figure 3C:
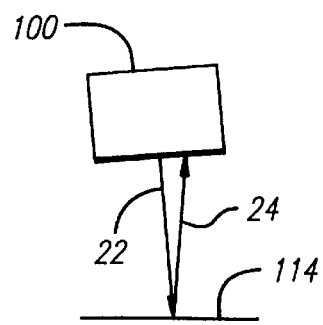

As shown in FIGS. 3a–3c, reflected specular light 24 from the light source 112 is received by the imaging element 110 only if the imaging system 100 is precisely positioned with respect to the target 114. The light level detector 108 allows the system 100 to automatically determine when the system is positioned such that specular light—as opposed to only diffuse light—is reflected onto the imaging element 110. As will be explained in more detail below, the microprocessor 104 is programmed to cause image data produced by the imaging element 110 to be stored in the data memory 106 only when the intensity of the light reflected onto the imaging element is comparable to that of specular light.

Figure 4:
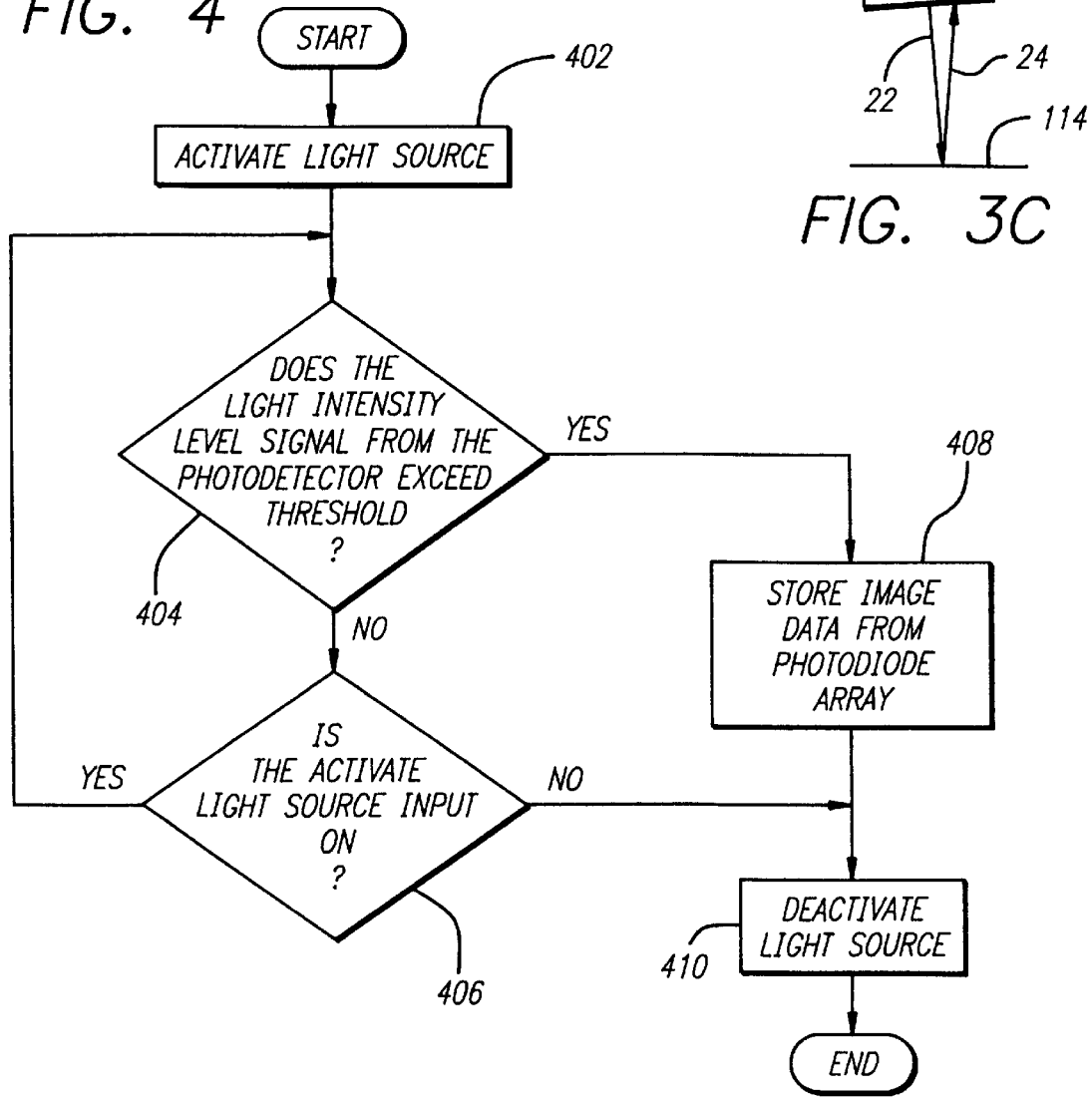
FIG. 4 illustrates an exemplary process for controlling operation of the embodiment illustrated in FIG. 2.

An exemplary program for controlling operation of the system 100 illustrated in FIG. 2 will now be described with reference to FIG. 4. In response to an activate light source signal 120, the microprocessor executes the process shown in FIG. 4. Initially, the light source 112 is activated at step 402. Digitized data from the light level detector 108 representing the intensity level of light 24 reflected onto the imaging element 110 is then compared to a predetermined threshold value at step 404. The predetermined threshold corresponds approximately to the intensity level of specular light reflected off of the target 114. If it is determined at step 404 that the digitized light intensity level signal from the light level detector 108 does not exceed the predetermined threshold, processing proceeds to step 406, where it is determined whether the activate light source signal 120 is still activated. If so, steps 404 and 406 are continuously repeated until either the digitized light intensity level signal from the light level detector 108 exceeds the predetermined threshold or the activate light source signal 120 is no longer active.

If it is determined at step 404 that the digitized light intensity level signal from the light level detector 108 exceeds the predetermined threshold indicating that specular light is being reflected onto the imaging element 110, processing proceeds to step 408, where the microprocessor outputs a "write" signal to the data memory 106, storing the image data produced by the imaging element 110. A signal, such as an audible beep, indicating the successful completion of the storing operation may be created in conjunction with step 408. The light source is then deactivated at step 410 and processing ends. If it is determined at step 406 that the activate light source signal 120 is no longer active, processing proceeds directly to step 410.

An alternative embodiment of the imaging system will now be explained with reference to FIG. 5. As will be explained in more detail below, the alternative embodiment is capable of reading printed bar codes using diffuse light and etched bar codes using specular light.

Figure 5:
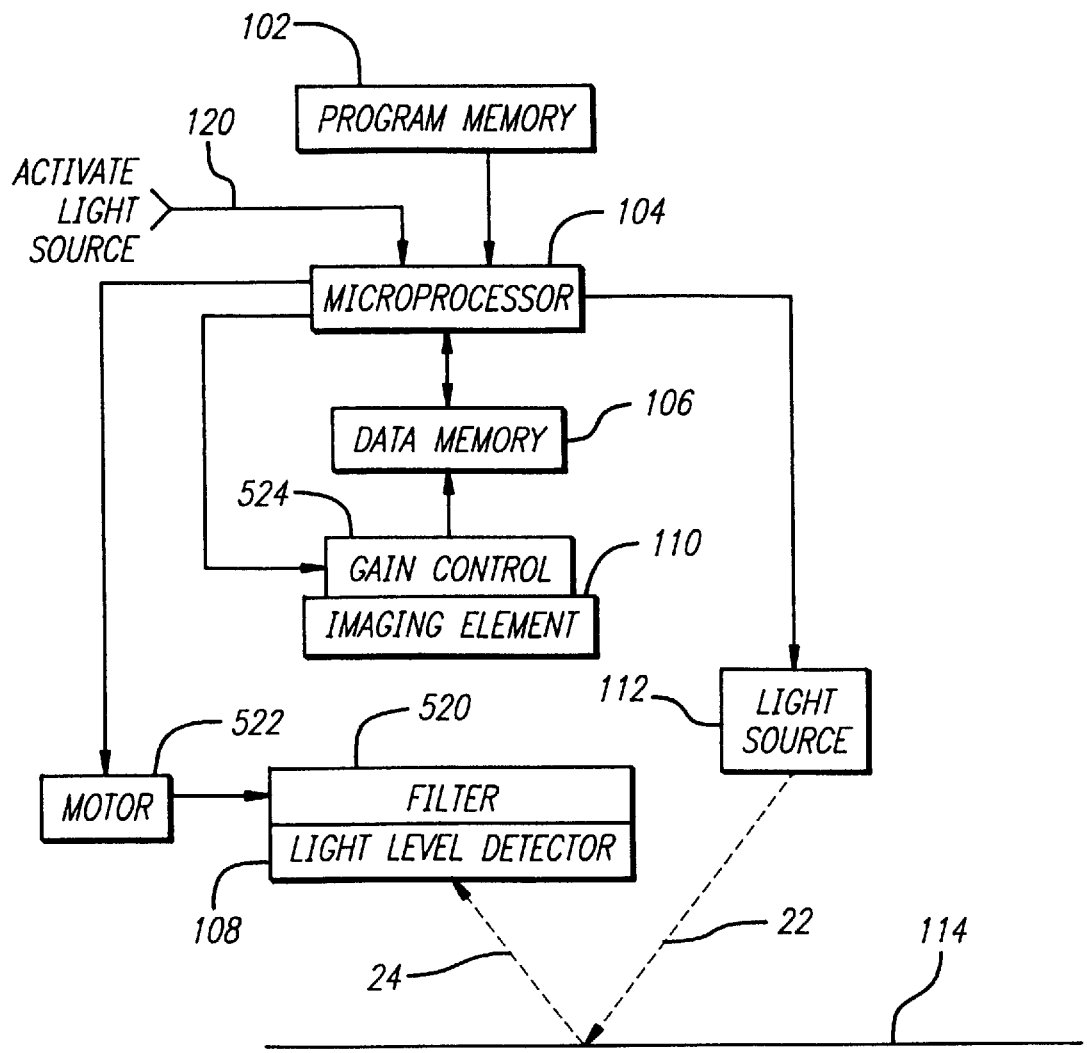
FIG. 5 illustrates an alternative embodiment of the imaging system.

The alternative embodiment illustrated in FIG. 5 includes a program memory 102, microprocessor 104, data memory 106, light source 112, and imaging element 110 that are similar to like elements described above in connection with FIG. 3. A filter 520 is also included to filter the light reflected onto the imaging element 110. For example, the specular light may be predominantly polarized in a particular orientation, while the diffuse light may be substantially non-polarized. A conventional polarized filter would then be capable of removing the specular light and permitting the diffuse light to transmit therethrough. The filter 520 blocks specular light, allowing only diffuse light to pass. The filter 520 is movable by a motor 522, which moves the filter from a position directly in front of the imaging element 110 to a position away from the imaging element. Thus, when the filter 520 is positioned directly in front of the imaging element 110, only diffuse light reaches the imaging element. On the other hand, when the filter 520 is positioned away from the imaging element 110, specular light can reach the imaging element. The filter includes a light level detector 108 that operates similarly to the light level detector described above in connection with FIG. 3.

A gain control 524 for controlling the output level of electrical signals produced by the imaging element 110 is also included. As will be explained in more detail below, the gain control 524 is set at a relatively high level while the light level detector 108 detects only diffuse light, but is set at a lower level when the light level detector detects specular light. This is necessary because, as explained above, the intensity level of diffuse light is significantly less than the intensity level of specular light. Consequently, the levels of the electrical signals produced by the imaging element 110 in response to diffuse light are significantly lower than the levels of the electrical signals produced in response to specular light.

Figure 6:
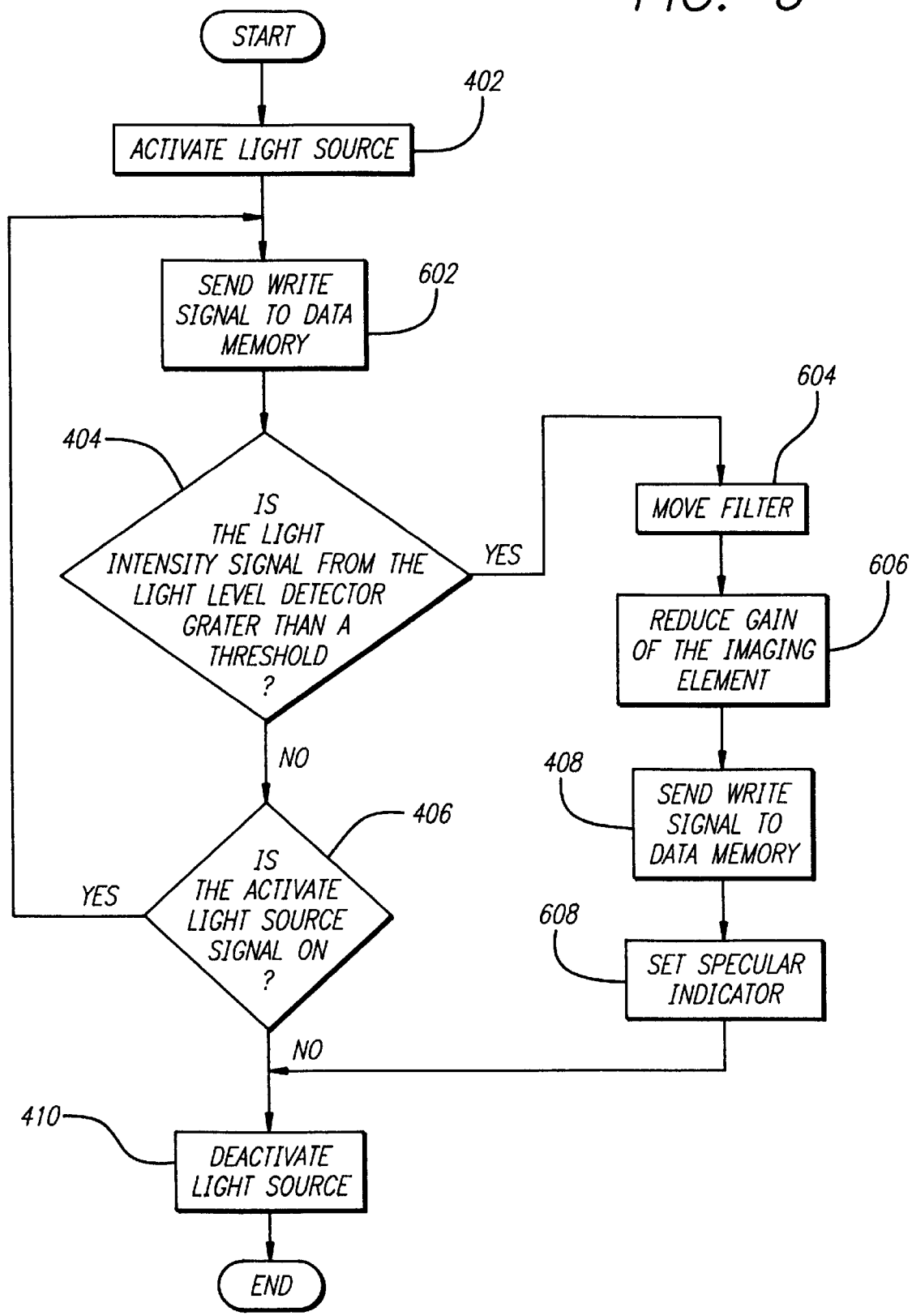
FIG. 6 illustrates an exemplary process for controlling operation of the embodiment illustrated in FIG. 5.

An exemplary program for controlling operation of the alternative embodiment illustrated in FIG. 5 will now be described with reference to FIG. 6. The process illustrated in FIG. 6 is similar to the process illustrated in FIG. 4 with the following differences. The process illustrated in FIG. 6 includes step 602 for storing image data produced by the imaging element 110 from diffuse light. Also, when it is determined at step 404 that the light level detector 108 is detecting specular light, the process illustrated in FIG. 6 moves the filter 520 away from the imaging element 110 at step 604 so that the specular light hits the imaging element. The process also reduces the gain of the electronic signals produced by the imaging element 110 at step 606. The process then causes the image data produced by the imaging element 110 in response to the specular light to overwrite image data previously stored in the data memory 106 at step 408. An indicator is set at step 608 indicating that image data stored in the data memory 106 was produced from specular light.

It should be noted that image data produced from specular light will be inverse with respect to image data produced from diffuse light. That is, a dark element in an image produced from diffuse light would appear light in an image produced from specular light, and likewise a light element in an image produced from diffuse light would appear dark in an image produced from specular light. The indicator set at step 608, which indicates that the image data stored in the image memory 106 was produced from specular light, can be utilized in decoding the image data. Numerous suitable methods for decoding image data are known to those skilled in the art and any such method may be utilized with the present invention.

Having thus described several alternative embodiments of the present invention, it should be apparent to those skilled in the art that certain advantages have been achieved. It should also be appreciated that various modifications, adaptations, and alternative embodiments thereof may be made within the scope and spirit of the present invention. For example, although the embodiments of the present invention described above include a light level detector 108 and the automatic generation of a write control signal (not shown) to the data memory 106, a simplified embodiment of the present invention could be constructed by eliminating the light level detector 108 and replacing the automatically activated write signal with a manually activated write signal. In such an embodiment, the user would manually activate the write control signal to the data memory 106 when the imager 100 is positioned with respect to the target 114 so as to receive specular light 24 reflected off of the target as illustrated in FIG. 3c. The invention is limited only by the following claims.

What is claimed is:

1. An apparatus comprising:
   a light source for directing source light onto a target, said source light reflecting off of said target as reflected light, said reflected light comprising a specular portion and a diffuse portion;
   means for discriminating between said specular and diffuse portions of said reflected light; and
   imaging means for creating image data of said target only from said specular portion of said received light.

2. The apparatus of claim 1, wherein said discriminating means further comprises:
   threshold determining means for determining whether an amount of said received light exceeds a predetermined threshold;
   a memory; and
   means for causing said image data created by said imaging means to be stored in said memory if said threshold determining means determines that said amount of received light exceeds said predetermined threshold.

3. The apparatus of claim 2 further comprising light amount determining means for determining said amount of received light.

4. The apparatus of claim 3, wherein said threshold determining means comprises program code for instructing a processor to compare said amount of light determined by said light amount determining means with said predetermined threshold.

5. The apparatus of claim 4, wherein said means for causing said image data to be stored in said memory comprises program code for instructing said processor to output a write signal to said memory if said comparison indicates that said amount of light determined by said light amount determining means exceeds said predetermined threshold.

6. The apparatus of claim 1, wherein said imaging means comprises an array of photodiodes.

7. The apparatus of claim 1, wherein said target includes a bar code symbol etched therein.

8. The apparatus of claim 7, wherein said bar code symbol is a two-dimensional symbol.

9. The apparatus of claim 1, further comprising a handheld device adapted to be spaced from said target during operation thereof.

10. A method for imaging a target comprising a low contrast symbol utilizing an imager, said imager comprising a light source, an imaging element, and a memory, said method comprising:
    directing source light from said light source onto said symbol, said source light reflecting off of said target as reflected light, said reflected light comprising a specular portion and a diffuse portion;
    discriminating between said specular and diffuse portions of said reflected light by positioning said imager so that said imaging element receives light comprising only said specular portion of said reflected light;
    creating image data of said target from said light received by said imaging element; and
    generating a signal causing said image data to be stored in said memory.

11. The method of claim 10, wherein the discriminating step further comprises the step of determining whether an amount of said light received by said imaging element exceeds a predetermined threshold.

12. The method of claim 11, wherein said generating step is performed automatically if said amount of light received by said imaging element exceeds said predetermined threshold.

13. The method of claim 10, wherein said low contrast symbol comprises a bar code symbol etched into said target.

14. The method of claim 13, wherein said bar code symbol is a two-dimensional symbol.

15. An apparatus comprising:
    a light source adapted to direct source light onto a target, said source light reflecting off of said target as reflected light, said reflected light comprising a specular portion and a diffuse portion;
    a discriminator element adapted to discriminate between said specular and diffuse portions of said reflected light; and
    an imaging element adapted to receive said reflected light and create image data of said target from said specular portion based on operation of said discriminator element.

16. The apparatus of claim 15, wherein said light source, said discriminator element and said imaging element are disposed within a common device adapted for manual manipulation by an operator, said common device being spaced from said target during operation thereof.

17. The apparatus of claim 15, wherein said discriminator element means further comprises:
    a threshold detector adapted to detect whether an amount of said received light exceeds a predetermined threshold; and
    a memory coupled to said threshold detector, said image data created by said imaging element being stored in said memory if said threshold detector detects that said amount of received light exceeds said predetermined threshold.

18. An apparatus comprising:
    a light source for directing source light onto a target, said source light reflecting off of said target as reflected light, said reflected light comprising a specular portion and a diffuse portion;
    determining means for receiving light comprising at least a portion of said reflected light and determining whether an amount of said received light exceeds a predetermined threshold;
    a light filter moveable between a position in close proximity to said receiving means such that said received light is filtered by said light filter and a position away from said receiving means such that said received light is not filtered by said light filter;
    means for moving said filter to said position in close proximity to said receiving means if said determining means determines that said amount of light exceeds said predetermined threshold;
    imaging means for creating image data of said target from said received light;
    a memory; and
    means for causing said image data created by said imaging means to be stored in said memory if said determining means determines that said amount of light exceeds said predetermined threshold.

19. The apparatus of claim 18 further comprising means for reducing an amplitude of said image data created by said imaging means if said determining means determines that said amount of light exceeds said predetermined threshold.

20. The apparatus of claim 18, wherein said imaging element comprises an array of photodiodes.

21. The apparatus of claim 18, wherein said target includes a bar code symbol etched therein.

22. The apparatus of claim 18, wherein said bar code is a two-dimensional symbol.

* * * * *